United States Patent [19]

Inaba et al.

[11] 4,406,576

[45] Sep. 27, 1983

[54] INDUSTRIAL ROBOT WITH A SAFEGUARD MECHANISM

[75] Inventors: Hajimu Inaba, Hino; Masao Kita, Kawachinagano; Shinsuke Sakakibara, Kunitachi; Ryo Nihei, Musashino, all of Japan

[73] Assignee: Fujitsu Fanuc Limited, Tokyo, Japan

[21] Appl. No.: 288,283

[22] Filed: Jul. 30, 1981

[30] Foreign Application Priority Data

Aug. 5, 1980 [JP] Japan .................................. 55-106729

[51] Int. Cl.³ .............................................. B66C 3/00
[52] U.S. Cl. .................................. 414/735; 29/402.01; 74/612; 269/74; 403/113
[58] Field of Search ............... 414/730, 735, 728, 694; 212/182, 188, 187; 29/568, 402.01, 402.03, 402.08; 408/710; 409/134; 403/113, 115; 269/79, 74; 254/8 B; 74/608, 612, 616, 617; 198/486, 466, 854; 248/274, 278, 282, 284, 285, 286, 289.1, 290, 291, 294

[56] References Cited

U.S. PATENT DOCUMENTS

| 4,122,758 | 10/1978 | Bieringer et al. | 92/15 X |
| 4,251,056 | 2/1981 | Maniglia | 254/8 B |
| 4,278,394 | 7/1981 | Johnson | 414/694 |

FOREIGN PATENT DOCUMENTS 1511609  5/1978  United Kingdom .

Primary Examiner—Robert J. Spar
Assistant Examiner—Donald W. Underwood
Attorney, Agent, or Firm—Armstrong, Nikaido, Marmelstein & Kubovcik

[57] ABSTRACT

An industrial robot with a safeguard mechanism for mechanically preventing occurence of any uncontrolled movement of a movable part of the industrial robot, the safeguard mechanism having mechanical engagement means which provides a disengageable mechanical lock between the movable part of the industrial robot and the stationary part of the industrial robot or another stationary member different from the industrial robot.

2 Claims, 7 Drawing Figures

INDUSTRIAL ROBOT WITH A SAFEGUARD MECHANISM

FIELD OF THE INVENTION

The present invention relates to an industrial robot operating as an industrial manipulating device, and more particularly, relates to an industrial robot with a safeguard mechanism capable of preventing accidents, such as collision of a movable part of the robot with a machine or machines located around the robot or injury to an operator by being struck by a movable part of the robot, which might occur when the movable part of the robot is moved by generation of erroneous control signals or by application of noise signals from the outside to the industrial robot.

Recently, industrial robots have been widely used with machines, such as automatic machine tools, for the purpose of promoting automatic operation of the machine tools by employing a robot as an industrial manipulating device which performs transfer of a workpiece to and from the machine tool or attachment of the workpiece to and detaching the workpiece from the machine tool. The operation of the industrial robot is controlled by a separate robot controller in which prescribed instructions for accomodating the operation of the robot to the operation of the machine tool are preliminarily stored. However, it might occur that a movable part of the robot performs an erroneous movement in the case where the prescribed instructions include any erroneous ones or in the case where some noise signals were given from the outside to the robot while the operation is stopped. For the purpose of preventing occurence of such erroneous movement of the robot, conventional safeguard methods have been employed, such as a method of providing an emergency stop means for the robot, a method of limiting the movable range of the movable part of the robot by the employment of some hardware or some software means, or a method of interlocking the robot and the maching tool so that the movable part of the robot is permitted to move only when a predetermined condition signal from the robot controller and a predetermined condition signal from the controller of the machine tool are simultaneously issued. However, these conventional methods are based on electrical or electronic technique. Therefore, rigid prevention of the erroneous movement of the movable part of the robot is not guaranteed. As a result, there is still some possibility of occurrence of an uncontrolled erroneous movement of the movable part of the robot due to the generation of noise signals from the outside of the robot while the robot should be stopped.

SUMMARY OF THE INVENTION

An object of the present invention is to provide an industrial robot with a safeguard mechanism which is provided with means for mechanically and rigidly locking a movable part of the robot as required for the purpose of rigidly preventing occurrence of any uncontrolled erroneous movement of the movable part of the robot.

In accordance with the present invention, a safeguard mechanism is provided for preventing occurrence of any uncontrolled movement of an industrial robot having a stationary part and a movable part when the industrial robot is mounted on a different stationary member and is used in association with a machine or machines, which mechanism comprises mechanical engagement means for providing a disengageable mechanical lock between the movable part of the industrial robot and one of the stationary parts of the industrial robot and a different stationary member.

DESCRIPTION OF THE DRAWINGS

It should be noted that the same reference numerals designate the same or like parts or elements, respectively through FIGS. 1 through 7.

DETAILED DESCRIPTION OF THE INVENTION

Figure 1:
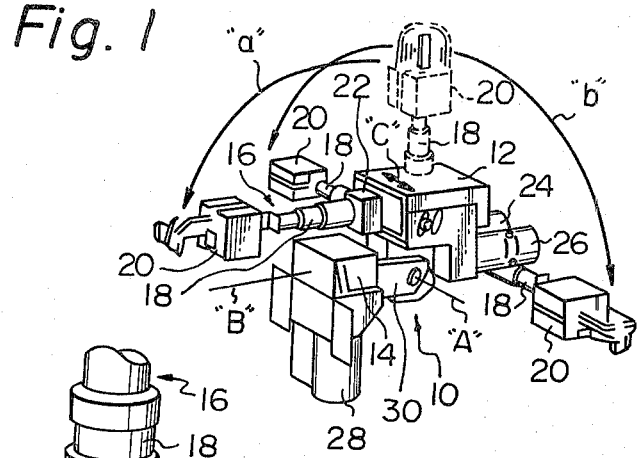
FIG. 1 is a perspective view of an industrial robot provided with a safeguard mechanism according to the present invention.

Referring to FIG. 1 which illustrates an industrial robot provided with a safeguard mechanism of the present invention, the industrial robot has a robot body 10 having a robot casing 12 and a robot base 14. The robot casing 12 is pivotable with respect to the robot base 14 as is described later. The industrial robot per se can be mounted on the side of a machine, such as a maching tool, by means of the robot base 14. It should be understood that the robot casing 12 is a part of a movable part of the industrial robot. On the robot casing 12 is slidably mounted a robot manipulating shaft 16 via a slide block 22. The robot manipulating shaft 16 is slidable in the direction shown by an arrow "C", and is comprised of a robot wrist 18 of which the innermost end is connected to the slide block 22, and a robot hand 20 attached to the outermost end of the robot wrist 18. The robot manipulating shaft 16 and the slide block 22 are forming a part of the movable part of the robot. Reference numerals 24, 26 and 28 designate drive motors, respectively, for driving the manipulating operation of the above-mentioned robot movable part, and the drive motors 24, 26 and 28 are driven by command signals fed from a separate robot controller (not illustrated in FIG. 1), so that a controlled manipulating operation of the movable part of the robot is conducted. Therefore, in the inside of the robot casing 12 and the robot base 14, there are incorporated mechanical elements of rotating mechanisms and feed mechanisms which are interconnected to the drive motors 24, 26 and 28. In the aforementioned movable part of the industrial robot, the robot casing 12 is turnable about an axis "A". The turning motion of the robot casing 12 automatically causes the turning motion of the robot manipulating shaft 16 in the direction shown by an arrow "a" between a standing position as shown by dashed lines and a falling position shown by solid lines. Thus, by the turning motion of the robot manipulating shaft 16, the industrial robot can perform, for example, the attaching of a workpiece to or the detaching of a workpiece from the machine tool. The robot casing 12 is also turnable about the axis "B". The turning motion of the robot casing 12 automatically causes the turning motion of the robot manipulating shaft 16 in the direction shown by an arrow "b" between the two falling positions shown by solid lines. During this turning motion of the robot manipulating shaft 16 in the direction shown by the arrow "b", the industrial robot can perform, for example, placing a workpiece onto a workpiece table (not illustrated in FIG. 1) or removing a workpiece from the workpiece table. Further, the robot manipulating shaft 16 is capable of sliding in the direction shown by the arrow "C" when the shaft 16 is in any one of the standing positions and the falling positions shown in FIG. 1. As will be understood from the foregoing description, during the turning motion or the sliding motion of the movable part in response to the commands from the robot controller, the industrial robot can perform diverse kinds of manipulating operations required by machines, such as machine tools. At this stage, it often occurs that an operator approaches or comes within the movable range of the movable part of the robot. For example, the operator might come close to the spindle of the machine tool for the purpose of setting up the machine tool for the work to be subsequently done. In such case, the operation of the industrial robot is electrically interrupted in the state where the robot manipulating shaft 16 is retained in its standing position as shown in FIG. 1. However, the supply of electric power from the electric power source to the robot is not stopped. Therefore, during the setting up operation by the operator, it might occur that some noise signals come into the robot controller from the outside. As a result, an uncontrolled movement of the robot manipulating shaft 16, such as unexpected falling movement of the manipulating shaft 16 from its standing position to the falling position along the arrow "a", might occur thus striking the operator, and as a result, the operator would be injured. In accordance with the present invention, there is provided a safeguard mechanism capable of mechanically preventing any uncontrolled movement of the movable part of the industrial robot while an operator approaches or comes within the movable range of the movable part of the robot.

The embodiments of the safeguard mechanism will now be described hereinafter with reference to FIGS. 2 through 7.

Figure 2:
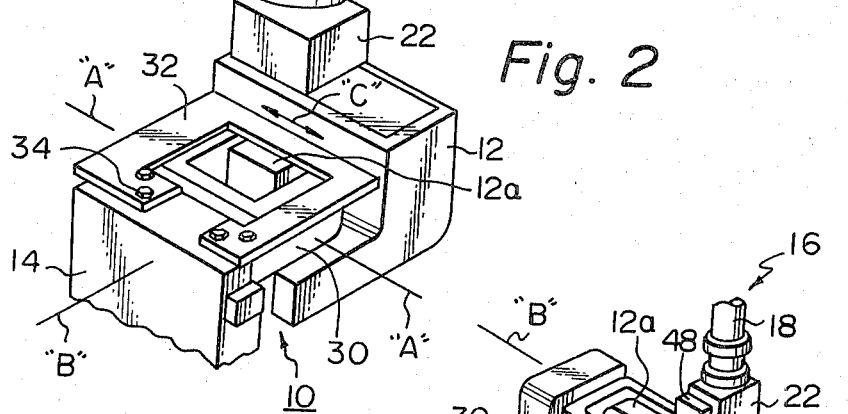
FIG. 2 is a partial perspective view of the safeguard mechanism according to an embodiment of the present invention.

Referring now to FIG. 2 which illustrates a safeguard mechanism of an embodiment of the present invention, the safeguard mechanism is comprised of a rigid plate 32 which is fixable to the robot base 14 forming a part of the stationary part of the robot body 10 of the industrial robot and the robot casing 12 forming a part of the movable part of the robot. The fixing of the rigid plate 32 to the robot base 14 and the robot casing 12 is acheived by the employment of an attachment means, such as conventional screw bolts or stop pins. When the rigid plate 32 is fixed to the robot base 14 and the robot casing 12, the movable robot casing 12 is mechanically locked to the stationary robot base 14, so that the turning of the robot casing 12 about both axes "A" and "B" is prevented. The rigid plate 32 may be either one of a rectangular plate or a C letter-shaped plate as shown in FIG. 2. In the illustration of FIG. 2, the rigid plate 32 is placed so as to bridge the upper surface of the stationary robot base 14, the upper surface of a U letter-shaped bracket 30 for the turning of the movable part about the axis "B", and the upper surface of a projection 12a which is pivoted to the bracket 30 for the turning of the movable part about the axis "A". The rigid plate 32 is fixed to the robot base 14 by the afore-mentioned fixing means 34. Thus, the turning of the robot casing 12 of the movable part of the robot about the axis "A" is prevented due to the engagement of the lower surface of the rigid plate 32 and the upper surface of the projection 12a, and the turning of the robot casing 12 about the axis "B" is prevented due to the engagement of the lower surface of the rigid plate 32 and the upper surface of the U letter-shaped bracket 30. Accordingly, when an operator has to approach a machine tool to be associated with the industrial robot or the robot per se for performing the afore-mentioned setting-up operation, if the rigid plate 32 is fixed to the stationary robot base 14 and the movable robot casing 12 prior to the setting-up operation, any occurrence of uncontrolled movement of the movable part of the robot is prevented with certainty. Therefore, the safety of the operator as well as the avoidance of the machine tool and the robot per se from the breakage are guaranteed.

Figure 3:
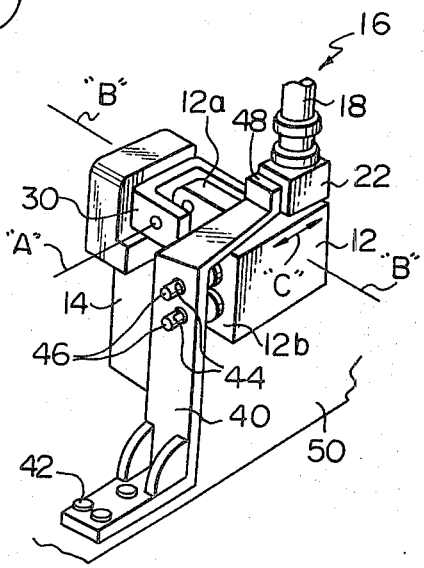
FIG. 3 is a partial perspective view of the safeguard mechanism according to another embodiment of the present invention.

FIG. 3 illustrates the safeguard mechanism of the industrial robot, according to another embodiment of the present invention. In the embodiment of FIG. 3, the industrial robot per se is mounted on a stationary base member 50 at a position opposite to an associated machine tool (not illustrated in FIG. 3) by means of the stationary robot base 14. The safeguard mechanism of the embodiment of FIG. 3, is comprised of two rigid pins 46,46 projecting from a side 12b of the robot casing 12, and a rigid angle member 40 having receipt holes 44,44 into which the two rigid pins 46,46 are engaged when the angle member 40 is appropriately positioned onto the stationary base member 50. That is, the two rigid pins 46,46 and the receipt holes 44,44 of the angle member 40 form a mechanical lock for rigidly stopping the movable part of the industrial robot. FIG. 3 illustrates a locking state where the angle member 40 is located in position so that the rigid pins 46,46 and the receipt holes 44,44 are engaged together, so that no turning motion of the robot casing 12 about the axis "A" or "B" is permitted. The angle member 40 has a free end 48 which is capable of stopping the slide block 22 of the movable part of the industrial robot. That is to say, as shown in FIG. 3, when the angle member 40 is attached to the stationary base member 50, the free end 48 of the angle member 40 abuts against or is opposed, via a small gap, to the slide block 22 which is slid to one of the extreme ends of the slidable range thereof. As a result, the free end 48 of the angle member 40 prevents the sliding movement of the slide block 22 in the direction shown by an arrow "C", and accordingly, the robot manipulating shaft 16 mounted on the slide block 22 is also prevented from being moved in the direction "C". From the foregoing description, it will be understood that in the embodiment of FIG. 3, it is possible to prevent all movement of the movable part of the industrial robot by the employment of the angle member 40 which can be attached to the stationary base member 50 as occasions require. Therefore, it is possible to mechanically and rigidly prevent any occurrence of an uncontrolled manipulating operation of the industrial robot, and to guarantee the safety for the operator of the maching tool. It should be understood that the angle member 40 may be attached to the base member 50 by means of appropriate fixing means, such as screw bolts or the like.

Figure 4:
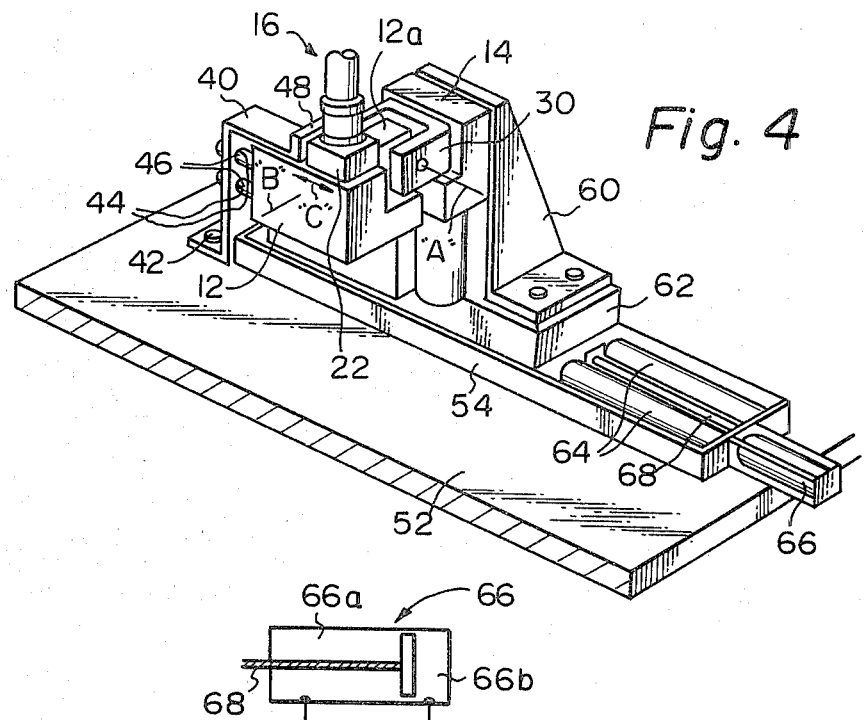
FIG. 4 is a perspective view of the safeguard mechanism according to a further embodiment of the present invention.

FIG. 4 illustrates the safeguard mechanism according to a further embodiment of the present invention. This embodiment is different from that of FIG. 3 in that since the industrial robot is slidably mounted on a stationary base plate 52, the engagement of the rigid pins 46 attached to the movable part of the robot into the receipt holes 44 of the rigid angle member 40 attached to the base plate 52 can be quickly and automatically achieved by applying a sliding motion to the industrial robot. The rigid angle member 40 is always fixed in position to the stationary base plate 52 by means of fixing means 42. A frame member 54 in the form of a box is also fixed to the surface of the stationary base plate 52 by means of appropriate fixing means. The frame member 54 incorporates therein a pair of guide rods 64,64 extending in the longitudinal direction of the frame member 54. On the pair of guide rods 64, is slidably mounted a slider 62 on which a bracket 60 is fixedly mounted. The bracket 60 supports the robot base 14 of the industrial robot. Therefore, the industrial robot is slidable together with the slider 62 in the longitudinal direction along the pair of guide rods 64. At this stage, it should be understood that the rigid pins 46 attached to the robot casing 12 are arranged so that when the industrial robot is slid to its one extreme slidable end adjacent to the angle member 40, the rigid pins 46 are able to be automatically engaged into the receipt holes 44 of the angle member 40. That is, the rigid pins 46 are arranged to be in alignment with the receipt holes 44 of the angle member 40. It should also be understood that when the rigid pins 46 of the industrial robot are engaged into the receipt holes 44 of the angle member 40, the slide block 22 of the industrial robot comes to a position where the block 22 abuts against or is opposed, via a small gap, to the free end 48 of the angle member 40. Therefore, not only the turning motion of the movable part of the robot about both the axes "A" and "B" but also the sliding motion of the movable part in the direction "C" are mechanically stopped. This fact means that when the rigid pins 46 are engaged into the receipt holes 44 of the angle member 40, no uncontrolled manipulating operation of the movable part of the industrial robot is permitted. As a result, the safety of the operator of the machine tool associated with the industrial robot can be ensured. Also, the occurrence of any accidents, such as the breakage of the industrial robot per se or the machine tool due to uncontrolled movement of the industrial robot can be avoided with certainty. The sliding of the industrial robot together with the slider 62 along the guide rods 64 may be manually conducted by the operator of the machine tool as occasions require. However, preferably, the sliding of the industrial robot together with the slider 62 is automatically caused by the employment of a cylinder 66 which can be actuated by appropriate command signals. The cylinder 66 which may be either a conventional hydraulic cylinder or a conventional pneumatic cylinder has a cylinder rod 68 connected, at an outer end, to the slider 62.

Figure 5:
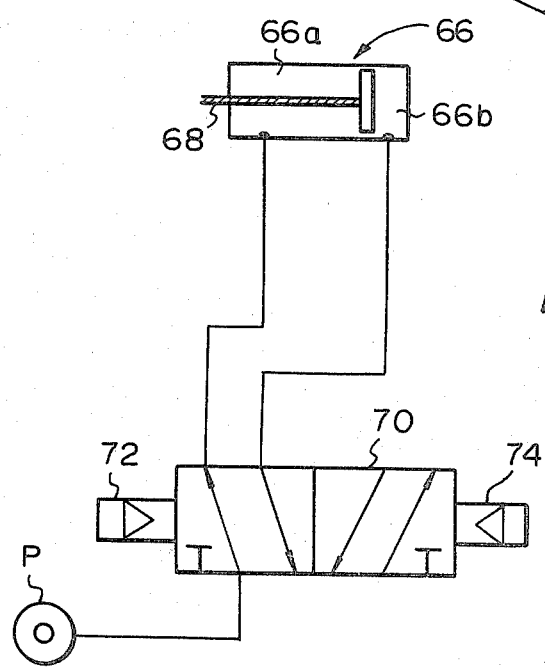
FIG. 5 is a hydraulic circuit diagram of a hydraulic cylinder employed for the embodiment of FIG. 4.

FIG. 5 illustrates an automatic control circuit for automatically actuating the cylinder 66 consisting of a pneumatic cylinder. The control circuit includes a self-holding type solenoid valve 70 arranged between a pressurized air source P and the cylinder 66. The solenoid valve 70 has two solenoids 72 and 74 as shown in FIG. 5. Thus, when the solenoid 72 is electrically energized, pressurized air is supplied from the pressurized air source P into a cylinder chamber 66a of the cylinder 66, so that the cylinder rod 68 is withdrawn into the cylinder 66. While when the solenoid 74 is electrically energized, the pressurized air is supplied into an opposite chamber 66b of the cylinder 66, so that the cylinder rod 68 is advanced outward. At this stage, it should be understood that in the case of the self-holding type solenoid valve 70, the two solenoids 72 and 74 can be alternately energized by alternately applying an electric drive pulse signal to the two solenoids, and that the one solenoid 72 or 74 is held energized until the electric drive pulse is applied to the other solenoid 74 or 72. The alternate energization of the two solenoids 72 and 74 switches the solenoid valve 70, so that the cylinder chambers 66a and 66b are alternately connected to the pressurized air source P.

Figure 6:
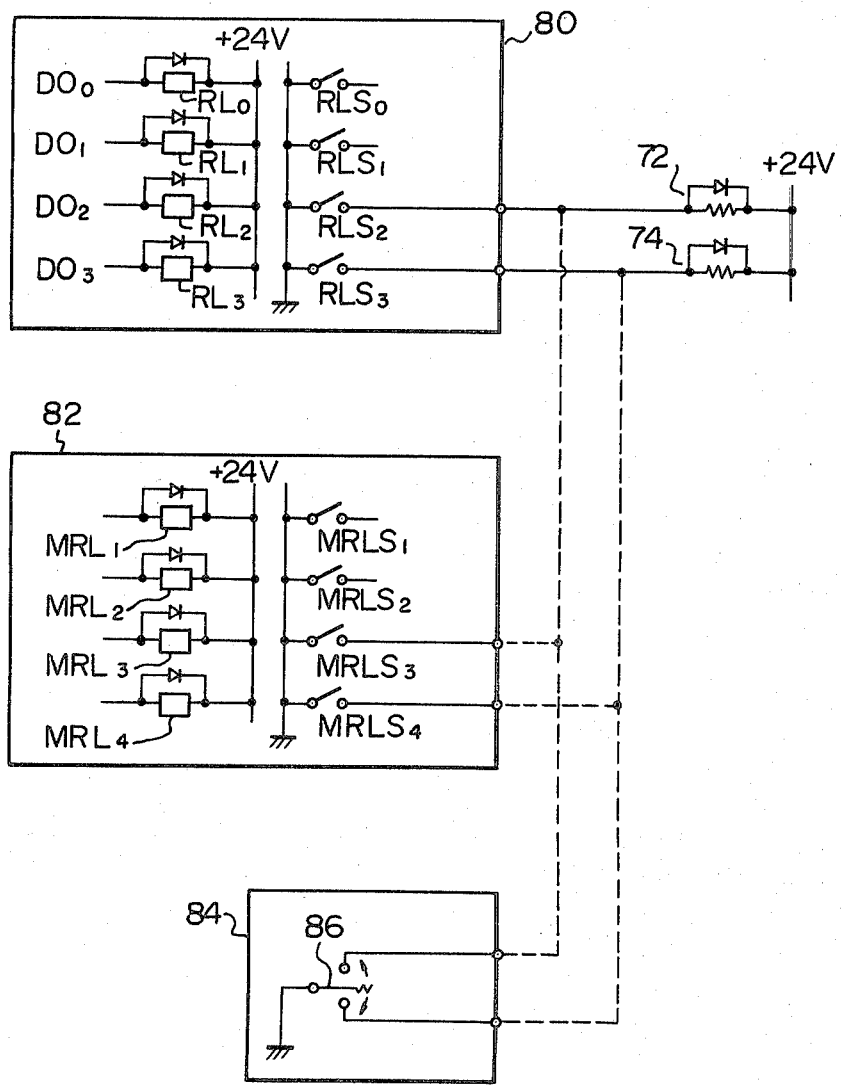
FIG. 6 is an electrical control circuit diagram of the safeguard mechanism of FIG. 4.

FIG. 6 illustrates an example of an electric control circuit adopted for controlling the switching of the self-holding type solenoid valve 70 by the employment of a command signal supplied from a robot controller or other appropriate signal supplying means.

In FIG. 6, the robot controller 80 incorporates therein command control circuits for controlling the manipulating operation of the industrial robot. Relays RL0, RL1,-RL3,-, which are successively operated by successively reading out preliminarily stored instruction data for the robot manipulating operation, are connected to the above-mentioned command control circuits. Therefore, if predetermined commands for energizing the solenoids 72 and 74 of the solenoid valve 70 are included in the preliminarily stored instruction data, the automatic switching of the solenoid 70 can be controlled by the robot controller 80. As a result, it is possible to automatically control the actuation of the cylinder 66 of FIGS. 4 and 5 and eventually to automatically control the sliding motion of the industrial robot along the guide rods 64 (FIG. 4). Consequently, the engagement of the rigid pins 46 (FIG. 4) into the receipt holes 44 (FIG. 4) of the angle member 40 as well as the disengagement of the rigid pins 46 from the receipt holes 44 can be automatically controlled by the employment of the robot controller 80. In the robot controller 80 of FIG. 6, when digital output DO2 or DO3 indicative of the command for energazing the solenoid 72 or 74 is alternately read out, the relays RL2 and RL3 are respectively operated so that the relay contacts RLS2 and RL3 are respectively closed. As a result, the solenoids 72 and 74 of the self-holding type solenoid valve 70 (FIG. 5) are respectively energized. In the robot controller 80, relays RL0 and RL1 having relay contacts RLS0 and RLS1, respectively, are those which are operated when digital commands D00 and D01 indicative of some of the robot manipulating operations are read out. Of course, in the robot controller 80, the same kind of many relays are incorporated in order to control the manipulating operation of the industrial robot.

In the case where the industrial robot with the safeguard mechanism of the present invention is associated with a numerically controlled machine tool, the solenoids 72 and 74 of the solenoid valve 70 (FIG. 5) may be energized due to the utilization of the control function of a numerical controller of the numerically controlled machine tool. FIG. 6 illustrates such a numerical controller 82 which includes a control circuit for controlling the alternate energization of the solenoids 72 and 74 of the solenoid valve 70. That is to say, the control circuit of the numerical controller 82 includes relays MRL3 and MRL4 having relay contacts MRLS3 and MRLS4, respectively which are operatively connected to the solenoids 72 and 74 of the solenoid valve 70. Therefore, the numerical controller 82 can issue commands for controlling the energization and the deenergization of the solenoids 72 and 74 through the relays MRL3 and MRL4. FIG. 6 also illustrate a manual controller 84 which includes a manually operated switch 84 for controlling the alternate energization of the solenoids 72 and 74.

Figure 7:
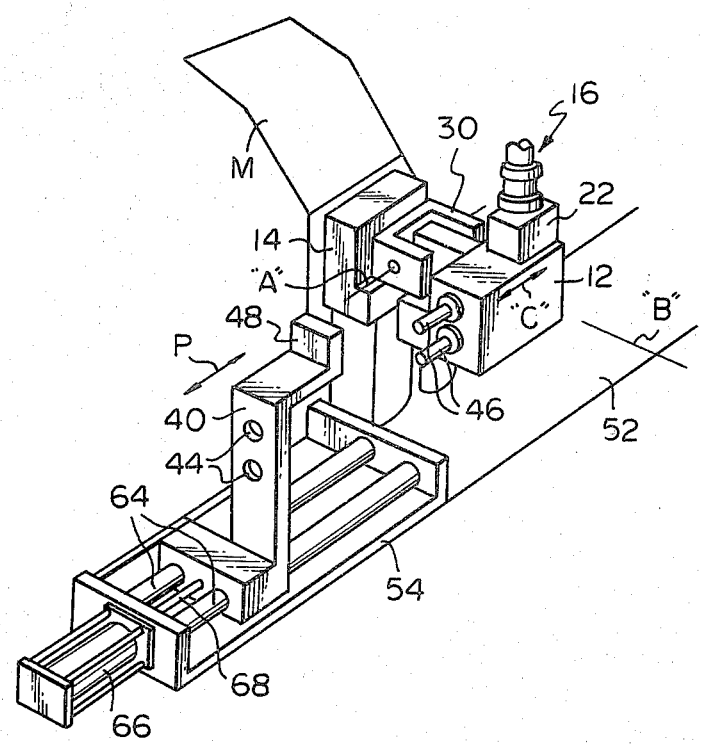
FIG. 7 is a perspective view of the safeguard mechanism according to a still further embodiment of the present invention.

Referring now to FIG. 7 which illustrates the safeguard mechanism according to a further embodiment of the present invention, it will be understood that this embodiment is different from the embodiment of FIG. 4 in the fact that the angle member 40 is arranged so as to be slid in the direction shown by an arrow "P" along the guide rods 64 by means of the cylinder 66 and that the industrial robot is fixedly positioned on the stationary base member 52 in front of an associated machine tool M. The robot casing 12 of the industrial robot is provided with rigid pins 46 which are engageable into the receipt holes 44 formed in the slidable angle member 40. Thus, when needed, the rigid angle member 40 is slid by the actuation of the cylinder 66 toward the industrial robot. As a result, the receipt holes 44 of the angle member 40 are automatically engaged with the rigid pins 46 of the industrial robot. Simultaneously, the free end 48 of the rigid angle member 40 abuts against or comes closest to the slide block 22 of the industrial robot. Accordingly, the mechanical prevention of the movable part of the industrial robot from being subjected to uncontrolled operation is completed, and the occurrence of uncontrolled movements of the movable part of the robot about the axes "A" and "B" and in the direction "C" can be prevented with certainty. It should be understood that the cylinder 66 for sliding the angle member 40 in the direction shown by an arrow "P" can be actuated in the same manner as the embodiment of FIG. 4. That is to say, the actuation of the cylinder 66 can be achieved due to the utilization of the robot controller 80, the numerical controller 82 or the manual control panel 84 as shown in FIG. 6.

From the foregoing description of the diverse embodiments of the present invention, it will be understood that in accordance with the present invention, there is provided a safeguard mechanism for mechanically and rigidly preventing occurrence of any uncontrolled operation of an industrial robot. Therefore, when an industrial robot with the safeguard mechanism of the present invention is operated in association with machines, such as machine tools, the safety for the operator of the machines can be guaranteed. Further, occurrence of every accident due to uncontrolled operation of the industrial robot can be avoided with certainty. At this stage, it should be understood that many modifications and variations to the described embodiments may be effected without departing from the scope of the present invention. For example, such modification may be easily made so that the rigid pins 46 are provided for the rigid angle member 40 and that the receipt holes 44 are formed in the robot casing 12 of the industrial robot so as to be engageable with the rigid pins 46 of the angle member 40.

We claim:

1. A safeguard mechanism for preventing occurrence of any uncontrolled movement of an industrial robot having a stationary part and a movable part when said industrial robot is mounted on a different stationary member and is used in association with a machine or machines, said safeguard mechanism comprising:
    mechanical engagement means for providing a disengageable mechanical lock between said movable part of said industrial robot and either said stationary part of said industrial robot or said different stationary member,
    said mechanical engagement means comprising a first rigid projecting means provided for said movable part of said industrial robot, and a second rigid member provided for said different stationary member, said second rigid member being formed with receipt hole means engageable with said first rigid projecting means,
    and
    means for moving said second rigid member until said receipt hole means of said second rigid member is engaged with said first rigid projecting means of said movable part of said industrial robot.

2. A safeguard mechanism for preventing occurrence of any uncontrolled movement of an industrial robot having a stationary part and a movable part when said industrial robot is mounted on a different stationary member and is used in association with a machine or machines, said safeguard mechanism comprising:
    mechanical engagement means for providing a disengageable mechanical lock between said movable part of said industrial robot and either said stationary part of said industrial robot or said different stationary member,
    said mechanical engagement means comprising a first rigid projecting means provided for said movable part of said industrial robot, and a second rigid member provided for said different stationary member, said second rigid member being formed with receipt hole means engageable with said first rigid projecting means, and
    means for moving said second rigid member until said receipt hole means of said second rigid member is engaged with said first rigid projecting means of said movable part of said industrial robot,
    said moving means further comprising cylinder means connected to said industrial robot or said second rigid member, and guide rod means for guiding movement of said industrial robot or said second rigid member.

* * * * *